(12) United States Patent
Glenn

(10) Patent No.: US 6,891,568 B1
(45) Date of Patent: May 10, 2005

(54) COLOR VIDEO CAMERA SYSTEM AND METHOD

(75) Inventor: William E. Glenn, Ft. Lauderdale, FL (US)

(73) Assignee: Florida Atlantic University, Boca Raton, FL (US)

( * ) Notice: Subject to any disclaimer, the term of this patent is extended or adjusted under 35 U.S.C. 154(b) by 814 days.

(21) Appl. No.: 09/653,983

(22) Filed: Sep. 1, 2000

Related U.S. Application Data

(60) Provisional application No. 60/171,361, filed on Dec. 22, 1999, and provisional application No. 60/151,965, filed on Sep. 1, 1999.

(51) Int. Cl.$^7$ .................. H04N 5/225; H04N 9/09; H04N 9/097; H04N 9/68; G02F 1/33
(52) U.S. Cl. .................. 348/262; 348/238; 348/236; 359/305
(58) Field of Search .................. 348/238, 262, 348/236; 359/305

(56) References Cited

U.S. PATENT DOCUMENTS

| | | | | |
|---|---|---|---|---|
| 3,603,723 A | * | 9/1971 | Tan | 348/238 |
| 4,107,732 A | * | 8/1978 | Adcock et al. | 348/238 |
| 4,853,787 A | * | 8/1989 | Kurth | 348/341 |
| 5,023,723 A | * | 6/1991 | Date et al. | 348/337 |
| 5,914,750 A | * | 6/1999 | SanGregory et al. | 348/368 |
| 6,356,379 B1 | * | 3/2002 | Kreymerman | 359/305 |
| 6,529,640 B1 | * | 3/2003 | Utagawa et al. | 382/284 |
| 6,614,471 B1 | * | 9/2003 | Ott | 348/238 |

* cited by examiner

*Primary Examiner*—Wendy R. Garber
*Assistant Examiner*—James M. Hannett
(74) *Attorney, Agent, or Firm*—Martin Novack

(57) ABSTRACT

A technique for producing electronic video signals representative of color images of a scene, includes the following steps: providing a luminance sensor and a color sensor having a color filter thereover; providing a pellicle beamsplitter, and providing a motion picture film camera type of lens system that focuses light from the image, via the beamsplitter, onto the luminance sensor and the color sensor; and producing electronic video signals from outputs of the luminance sensor and the color sensor. The pellicle can be ultrasonically excited to effect optical prefiltering.

9 Claims, 3 Drawing Sheets

COLOR VIDEO CAMERA SYSTEM AND METHOD

RELATED APPLICATIONS

The present Application claims priority from U.S. Provisional Patent Application No. 60/151,965, filed Sep. 1, 1999 and from U.S. Provisional Patent Application No. 60/171,361, filed Dec. 22, 1999, and said Provisional Patent Applications are incorporated herein by reference.

FIELD OF THE INVENTION

This invention relates to a color video camera system that can be utilized for motion picture film origination.

BACKGROUND OF THE INVENTION

Color motion pictures are often made by shooting the action with a film camera, converting the images to digital form, computer processing the digital images, and then scanning the processed images back onto film for release. It would be advantageous to have a practical electronic color video camera that could directly shoot the action to obtain color video from which good quality color motion picture film could ultimately be produced, but this has not yet been achieved. A major reason is that the expensive high quality lenses used in motion picture film cameras have optical characteristics and requirements that are not readily adaptable to electronic video cameras. A 24 frames per second progressively scanned color video camera for electronic film origination has become available. It is a three-sensor camera that must use lenses designed for television cameras, and cannot achieve the image quality that is obtainable with the high quality lenses used in motion picture film cameras.

It is among the objects of the present invention to devise an electronic color video camera that can utilize the types of high quality lenses that are used in motion picture color film cameras.

SUMMARY OF THE INVENTION

In accordance with an embodiment of the method of the invention, there is set forth a technique for producing electronic video signals representative of color images of a scene, comprising the following steps: providing a luminance sensor and a color sensor having a color filter thereover; providing a beamsplitter, and providing a motion picture film camera type of lens system that focuses light from the image, via the beamsplitter, onto the luminance sensor and the color sensor; and producing electronic video signals from outputs of the luminance sensor and the color sensor. In a preferred embodiment of the invention, the step of providing a beamsplitter comprises providing a pellicle beamsplitter. In this embodiment, the step of providing a color sensor having a color filter thereover comprises providing a color sensor with a two-color checkerboard filter pattern, preferably red and green.

Further features and advantages of the invention will become more readily apparent from the following detailed description when taken in conjunction with the accompanying drawings.

DETAILED DESCRIPTION

Figure 1:
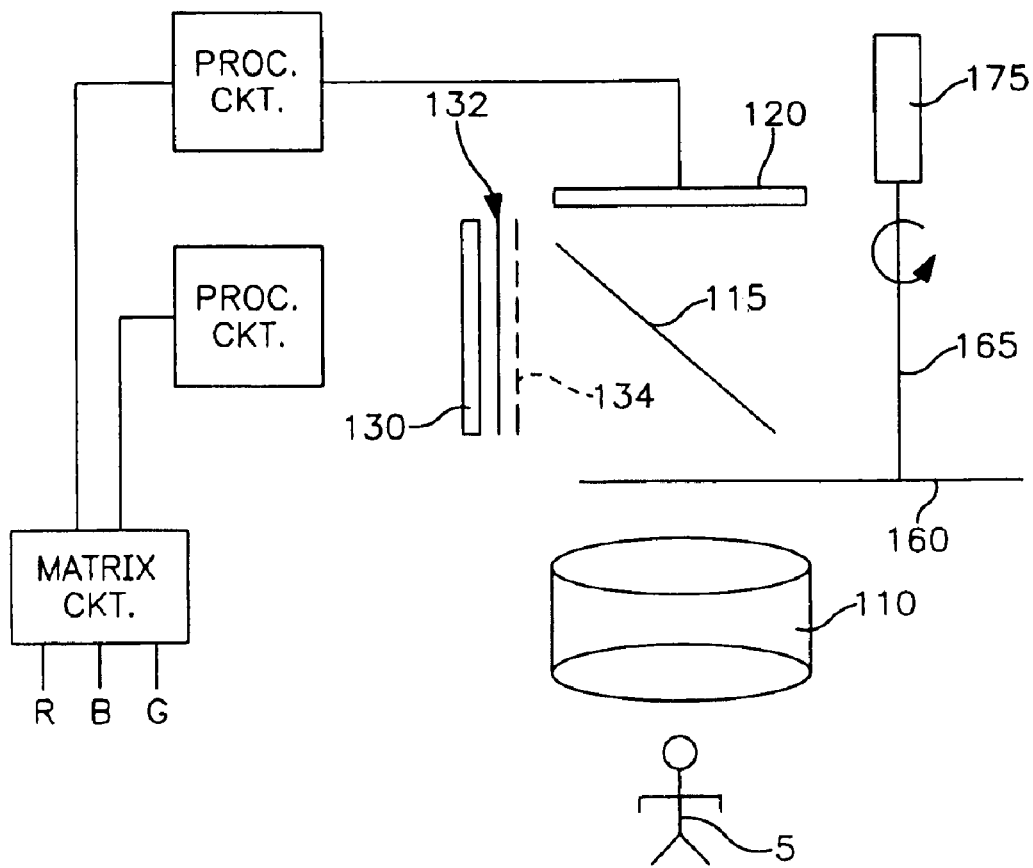
FIG. 1 is a schematic diagram, partially in block form, of an apparatus in accordance with an embodiment of the invention and which can be used in practicing an embodiment of the method of the invention.

FIG. 1 shows a camera system in accordance with an embodiment of the invention and which can be utilize in practicing an embodiment of the method of the invention. Light received from a scene 5 being viewed (typically, a moving scene) is received and focused by a motion picture film camera type of lens, represented in the Figure by lens 110, which is typically a multi-element lens or lens system. [As used herein, the term "lens system" is intended to generically cover a lens of one or more elements as well as a system of lenses. The term "lens" is sometimes used as convenient shorthand for a lens system.] Light focused by the lens is divided, in a manner described further hereinbelow, by a pellicle beamsplitter 115, for incidence on sensors 120 and 130 which may be, for example, suitable CCD sensors. In the present embodiment, the sensor 120 is a luminance (Y) sensor, and the sensor 130 is provided with a color pattern filter 132 and serves as a color sensor. (The image on the color sensor is reversed, and can be electronically reversed back on readout). Each sensor is coupled with suitable processing circuitry (labeled 125 in the luminance channel and labeled 135 in the color channel), including color detect and matrix circuitry in the color channel, and suitable filtering in both channels. The signals can be combined and matrixed, as represented by the block 140 to obtain, for example, R, G, B, and/or color difference signals and luminance. Reference can be made, for example, to copending U.S. patent application Ser. No. 09/152,395 and copending U.S. patent application Ser. No. 09/362,603, both assigned to the same assignee as the present invention, and both disclosing aspects of two channel processing. It will be understood that a number of features of the invention do not depend on a particular processing approach.

One of the advantages of the present embodiment is that it can employ high quality camera lenses designed for motion picture film cameras. The camera system of FIG. 1 is a two-sensor system with some special characteristics that permit use of such lenses. Typically the high quality lenses designed for motion picture film cameras have a relatively short back throw (less than about 1.5 times the image width) that is incompatible with the optical path length associated with the splitter (e.g. dichroic prism) of a three sensor camera. The present embodiment employs a pellicle splitter (115) that avoids the need for, say, the glass prism. The motion picture film camera lenses are not corrected for the aberrations introduced by the glass path and the two rather than three sensor design shortens the back throw behind the lens so that the motion picture film camera type of lenses (which have a relatively short back throw) can be used.

Figure 2:
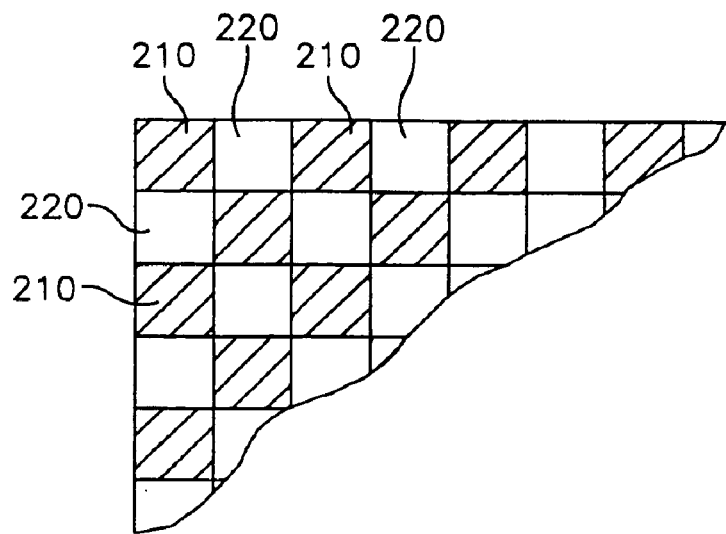
FIG. 2 is a partially broken away diagram illustrating the two color checkerboard pattern filter that is used in embodiments of the invention.

In a form of the invention, the pellicle has a dichroic coating on it that passes a spectrum that makes the output from the Y sensor have the spectral distribution appropriate for Y. The remaining light is mostly red and blue. In an embodiment hereof, the color filter 132 of FIG. 1 employs red and blue diagonally sampled filters. This is shown in FIG. 2, which illustrates a checkerboard pattern having cross-hatched boxes 210 representative of red, and non-cross-hatched boxes 220 representative of blue. This provides a diagonally sampled red and blue color output. The horizontal and vertical resolution of these colors is consequently the same as the luminance resolution. However, the diagonal resolution is half that of the luminance diagonal resolution. This is acceptable since there is normally less detail in the diagonal directions in images and the human visual system has less color acuity on the diagonal. Using this filter, R-Y and B-Y can be derived from the signals from the two sensors. The Y signal is obtained from the luminance sensor 120. In this embodiment, R, B, and Y are gamma corrected before subtracting. This gives a signal that is very close to log R/Y and log B/Y, which are isoluminant color signals. This has a considerable advantage over color difference signals that are produced from a Y signal that is derived from the sum of gamma corrected R, G, and B (which is not isoluminant). The only disadvantage is that to derive green, one must first obtain gamma corrected R and B signals by adding gamma corrected Y to the color signals and then the R, B, and Y signals must be un-gamma corrected to give linear signals before subtracting the appropriate proportions of R and B from Y to get green. The green then needs to be gamma corrected. Reference can be made to W. E. Glenn et al., Logarithmic A/D Converters Used In Video Signal Processing Systems, SMPTE Journal, 101/5, May, 1992. By using diagonally sampled R and B signals, the horizontal resolution and vertical resolution of R and B are the same as Y. The diagonal resolution, however, is half the diagonal resolution of Y, which is 1.4 times its horizontal resolution. The combination of a diagonally sampled two color sensor (rather than a 3 color sensor) combined with isoluminant color signals will give improved rendition of brightness in saturated colors. This is an advantage for "blue screen" processing.

In further embodiment of the FIG. 2 color filter, the checkerboard passes red and green; i.e., for example, the boxes 210 being red and the boxes 220 being green. This embodiment has the advantage of having blue (rather than green) be the derived color, since the derived color will have the lowest signal-to-noise ratio, and this can be best tolerated in the blue.

In reading out the checkerboard patterns, the R and G (or R and B) images in the checkerboard pattern can be decimated (e.g. by setting odd pixels to zero on line 1 (and all odd lines) and even pixels to zero on line 2 (and all even lines). Interpolation can be used to obtain the missing pixels. The luminance channel signal can be appropriately filtered to obtain a lower resolution luminance signal for derivation and processing in the color channel.

Because of the reduced diagonal resolution that results from the color patterns, it is desirable to use an optical pre-filter to avoid a color morie pattern being visible when there is detail on the diagonal. One form of an optical prefilter, represented at 134 in FIG. 1, is a phase diffraction grating. In conjunction with the diagonal color filter pattern, an arrangement of two gratings oriented with grating lines at 45 degrees (that is, diagonally oriented) with respect to the sensor. The gratings can be pressed replica gratings after the optimum grating spacing and amplitude have been determined. A phase grating with adjustable amplitude can be produce using the patterned alignment process described in U.S. Pat. No. 5,638,201. Alternatively, adjustable phase grating can be produced in a glass plate using Bragg diffraction of an ultrasonically driven plate. The ultrasound frequency and amplitude will determine the grating spacing and amplitude.

Figure 3:
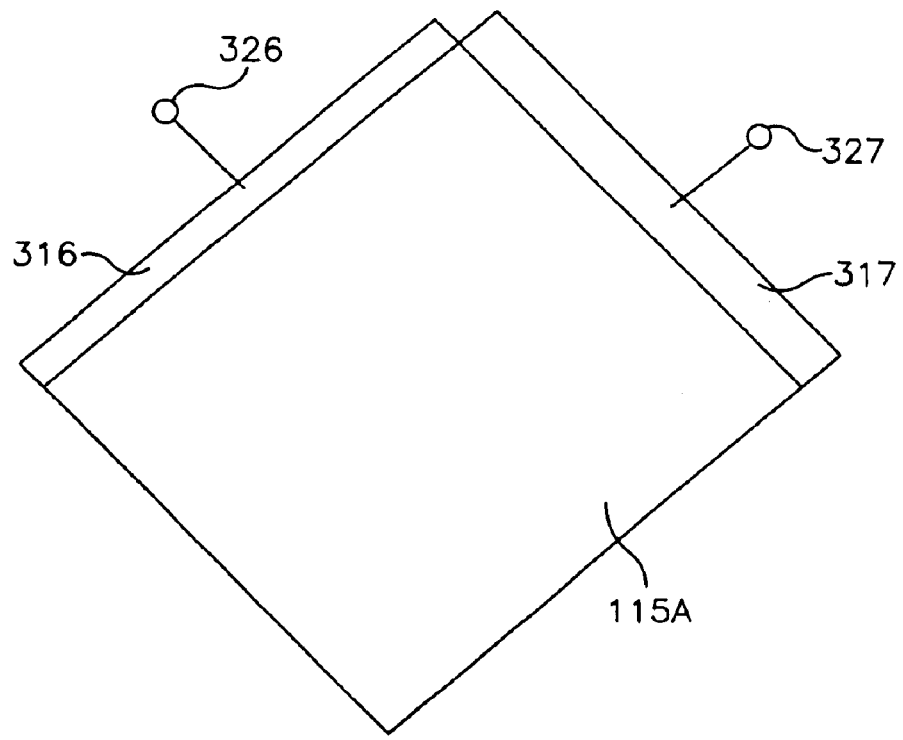
FIG. 3 is a diagram of an opto-acoustical filter, employing a pellicle, that is utilized in embodiments of the invention.

In accordance with an embodiment of the invention, the beam splitting pellicle (preferably plastic, although other materials can be used) can be utilized as an adjustable opto-acoustical low pass filter, as disclosed in copending U.S. patent application Ser. No. 09/455,884, assigned to the same assignee as the present Application. As described therein, ultrasonic excitation can be applied to edge transducers, for example to produce controlled low pass optical filtering of the image reflected toward the color sensor 130 with the color pattern 132 thereon. In this case, to match the diagonal pattern of the checkerboard color filter, the FIG. 3 arrangement can be used, with the transducers diagonally oriented with respect to the vertical and horizontal reference directions of the image. The pellicle is represented at 115A and the transducers 316 and 317 have excitation applied at terminals 326 and 327, respectively. This will result in diagonally oriented waves in the pellicle that achieve the desired optical prefiltering without an additional component.

Figure 4:
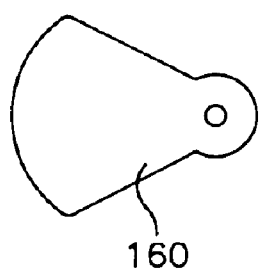
FIG. 4 is a diagram of the rotating shutter that can be utilized in embodiments of the invention.

Depending on the type of sensor used, a shutter may be required to cut off the light during charge transfer from the light sensing area to the storage area. [For background regarding use of a shutter, see U.S. Pat. No. 4,667,226.] This would only require about 1.5 ms, but should preferably be longer. A shorter exposure time improves motion blur for moving objects. In FIG. 1, a mechanical shutter 160 is driven on shaft 165 by motor 175. An embodiment of the shutter is shown in FIG. 4.

Figure 5:
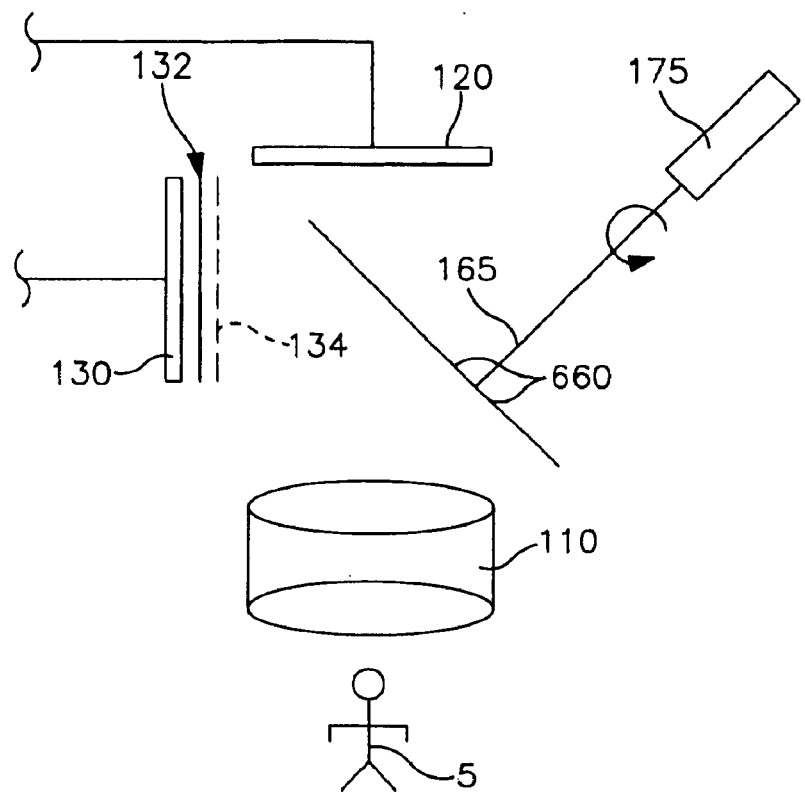
FIG. 5 is a schematic diagram, partially in block form, of another embodiment of an apparatus in accordance with the invention and which can be used in practicing another embodiment of the method of the invention.
Figure 6:
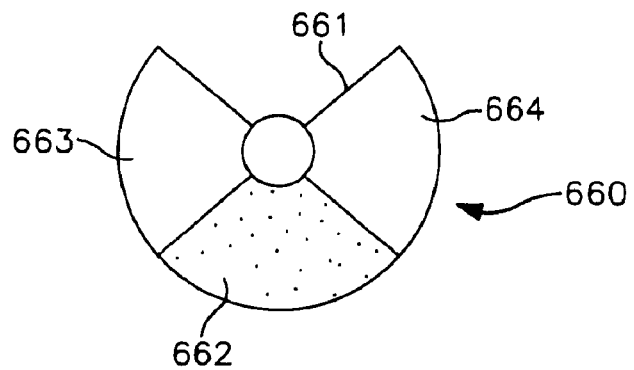
FIG. 6 is a diagram of a rotating shutter that is utilized in the FIG. 5 embodiment.

A further embodiment of a mechanical shutter is shown in FIGS. 5 and 6. In this case, the shutter (660) is in the usual position of a splitter, that is at a diagonal with respect to the image direction. The shutter 660 is driven by motor 175 to rotate with the shaft 165. The layout of shutter 660, which is actually a rotating combination shutter/mirror, is shown in FIG. 6, and it has on open sector 661 which opposes a dark opaque sector 662, as well as opposing mirror (reflective) sectors 663 and 664. The vertical transfer to the storage registers occurs when the dark sector of the shutter is over the lens. The open section exposes the Y sensor 120 and two mirror sections expose the color sensor 130. This produces a color exposure on either side temporally of the luminance exposure. Color is temporally longer but centered in time coincident with the Y exposure.

What is claimed is:

1. A method for producing electronic video signals representative of color images of a scene, comprising the steps of:

providing a luminance sensor and a color sensor having a color filter thereover, said color sensor having a two color checkerboard filter pattern;

providing a pellicle beamsplitter, which is also operative as an acousto-optical low-pass filter, and providing a motion picture film camera type of lens system that focuses light from said image, via said beamsplitter, onto said luminance sensor and said color sensor;

applying ultrasonic excitation to said pellicle to implement optical low pass pre-filtering of light from said image that is focused on said color sensor, said ultrasonic excitation being applied to said pellicle along diagonal directions with respect to vertical and horizontal reference directions of said color sensor to effect optical pre-filtering of the light focused on said color sensor; and producing electronic video signals from outputs of said luminance sensor and said color sensor.

2. The method as defined by claim 1, wherein said step of providing a color sensor with a two-color checkerboard filter pattern comprises providing a red-blue checkerboard filter pattern.

3. The method as defined by claim 1, wherein said step of providing a color sensor with a two-color checkerboard filter pattern comprises providing a red-green checkerboard filter pattern.

4. The method as defined by claim 1, further comprising the step of providing optical pre-filtering of light from said image that is focused on said color sensor.

5. The method as defined by claim 4, wherein said step of providing optical pre-filtering comprises providing a grating in the path of light from said image that is focused on said color sensor.

6. The method as defined by claim 5, wherein said step of providing a grating includes orienting lines of said grating on a diagonal with respect to vertical and horizontal reference directions of said color sensor.

7. A method for producing electronic video signals representative of color images of a scene, comprising the steps of:

providing a luminance sensor and a color sensor having a color filter thereover, said color sensor having a two color checkerboard filter pattern;

providing a beamsplitter, and providing a motion picture film camera type of lens system that focuses light from said image, via said beamsplitter, onto said luminance sensor and said color sensor;

providing optical pre-filtering of light from said image that is focused on said color sensor, said step of providing optical pre-filtering comprising providing a grating and orienting lines of said grating on a diagonal with respect to vertical and horizontal reference directions of said color sensor; and producing electronic video signals from outputs of said luminance sensor and said color sensor.

8. Apparatus for producing electronic video signals representative of color images of a scene, comprising:

a luminance sensor;

a color sensor having a color filter thereover;

a beamsplitter;

a film camera type of lens system, arranged to focus light from said image, via said beamsplitter, onto said luminance sensor and said color sensor;

an optical pre-filter for pre-filtering light from said image that is focused on said color sensor, said optical pre-filter comprising a grating with grating lines oriented on a diagonal with respect to vertical and horizontal reference directions of said color sensor; and means for producing electronic video signals from outputs of said luminance sensor and said color sensor.

9. A method for producing electronic video signals representative of color images of a scene, comprising the steps of:

providing a luminance sensor and a color sensor having a color filter thereover, said color filter comprising a two-color checkerboard filter pattern;

providing a pellicle beamsplitter, and providing a lens system that focuses light from said image, via said pellicle beamsplitter, onto said luminance sensor and said color sensor;

applying ultrasonic excitation to said pellicle beamsplitter along diagonal directions with respect to vertical and horizontal reference directions of said color sensor to effect optical pre-filtering of the light focused on said color sensor; and producing electronic video signals from outputs of said luminance sensor and said color sensor.

* * * * *